United States Patent [19]

MacIntosh et al.

[11] Patent Number: 4,516,433

[45] Date of Patent: May 14, 1985

[54] FLOW SENSOR

[75] Inventors: John A. MacIntosh, Cupertino; Willard L. Zeigner, San Ramon, both of Calif.

[73] Assignee: Zemco, Inc., San Ramon, Calif.

[21] Appl. No.: 514,520

[22] Filed: Jul. 18, 1983

[51] Int. Cl.³ .............................................. G01F 1/70
[52] U.S. Cl. ............................... 73/861.05; 73/861.32
[58] Field of Search ................ 73/255, 861.05, 861.81, 73/861.83, 861.33, 861.32

[56] References Cited

U.S. PATENT DOCUMENTS

| | | | |
|---|---|---|---|
| 2,776,568 | 1/1957 | Ward et al. | 73/255 |
| 4,157,660 | 6/1979 | Spacek | 73/255 |
| 4,263,812 | 4/1981 | Zeigner | 73/861.05 |

FOREIGN PATENT DOCUMENTS 509749 7/1939 United Kingdom ............. 73/861.81

Primary Examiner—Herbert Goldstein
Attorney, Agent, or Firm—Owen, Wickersham & Erickson

[57] ABSTRACT

A fluid flow sensor for measuring the flow rate of a liquid stream, such as fuel, to an internal combustion engine. A pair of preformed body members are held together by external fasteners and provide internal cavities including a continuous oval shaped raceway containing a freely moveable ball. An inlet cavity connected to the raceway communicates with an inlet conduit through one body member and connectable to the liquid supply. An outlet conduit extends from the raceway through the other body member and is connectable to the liquid user or engine. Within the inlet cavity is a nozzle assembly that provides a first relatively small passage for liquid when it flows through the inlet conduit at a relatively slow rate and a second relatively large passage for liquid when it flows at a relatively high rate, so that even at low liquid flow rates, a sufficient force is produced at the nozzle exit to keep the race ball moving smoothly in the raceway. A suitable counter is provided for sensing each complete passage of the race ball in the raceway to provide a signal for use in measuring the flow rate of liquid therein.

5 Claims, 18 Drawing Figures

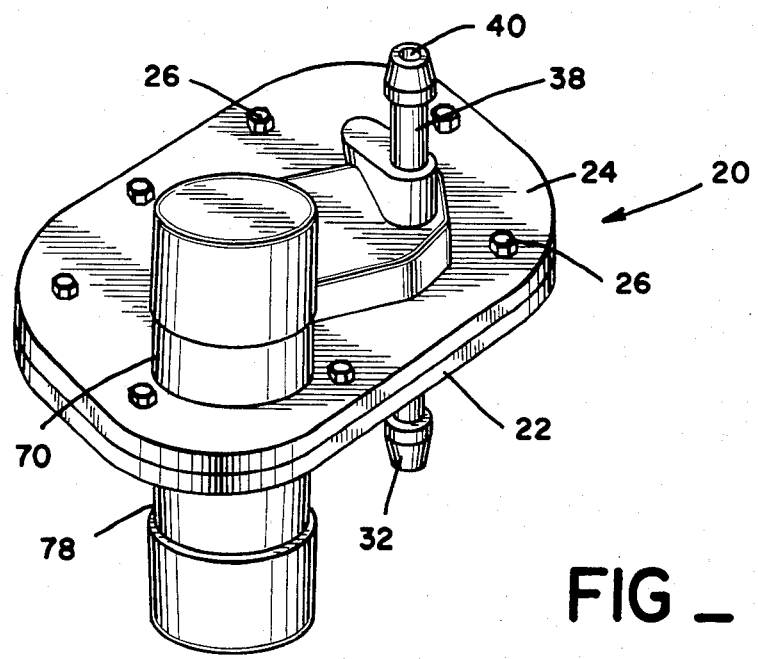
FIG_1
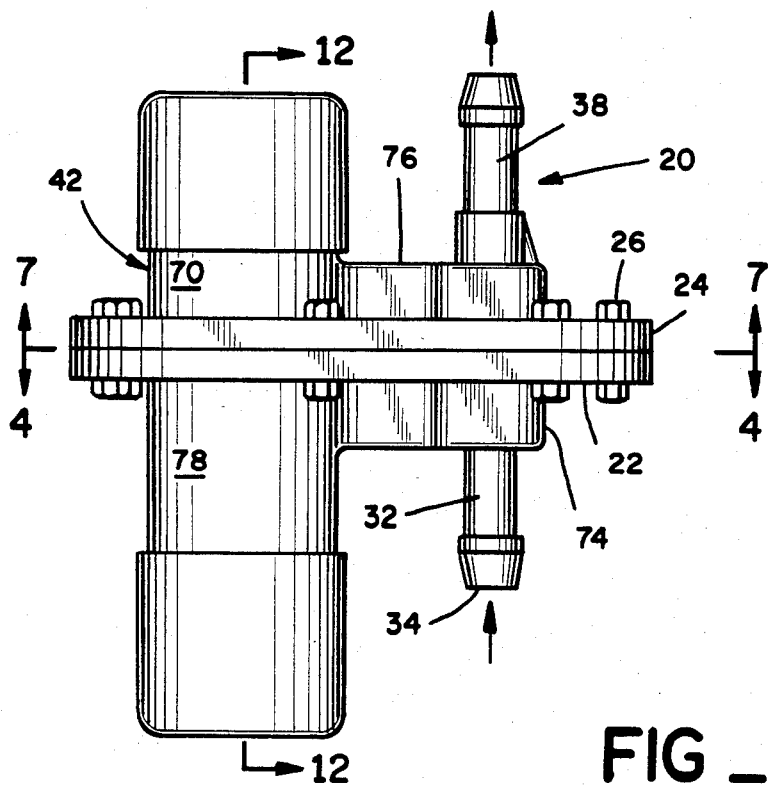
FIG_2

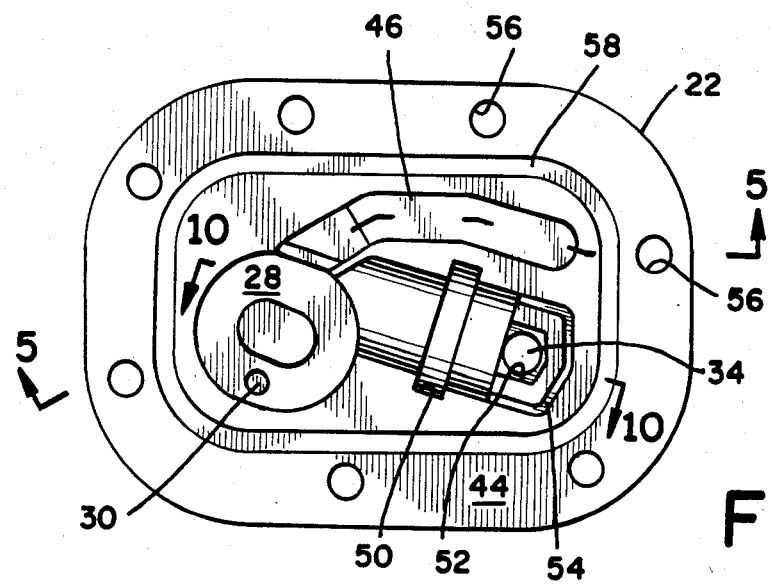
FIG _ 4
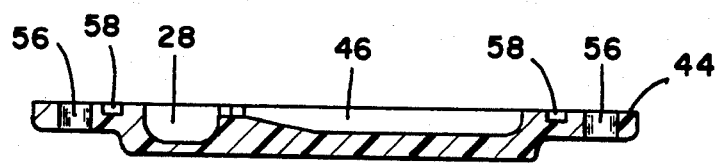
FIG _ 5
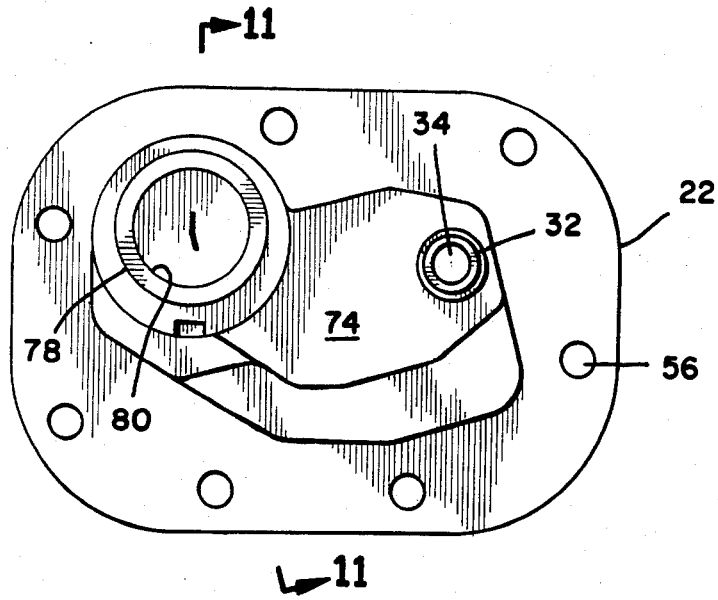
FIG _ 3

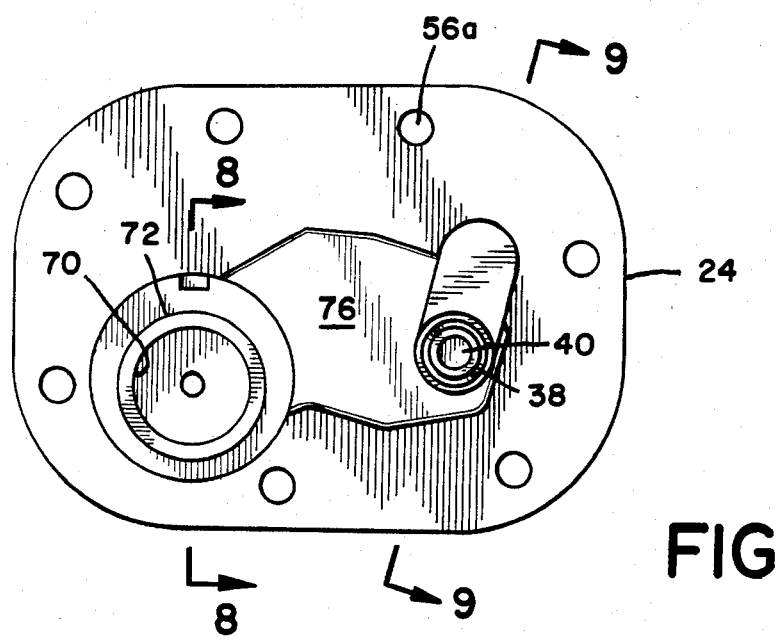
FIG_6
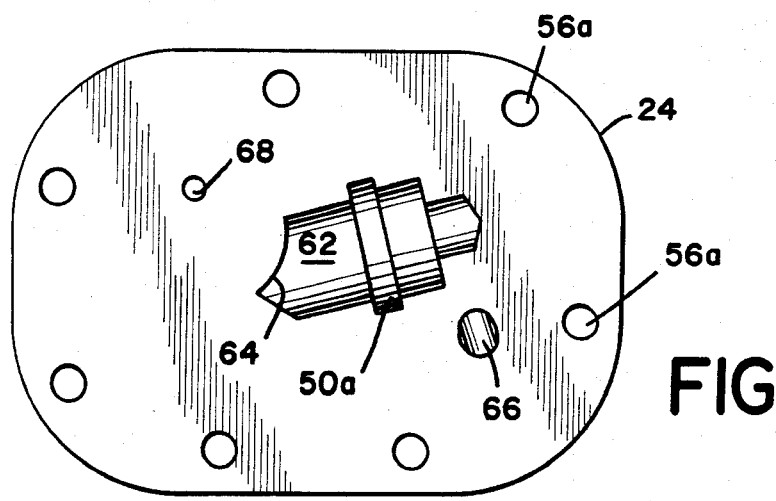
FIG_7
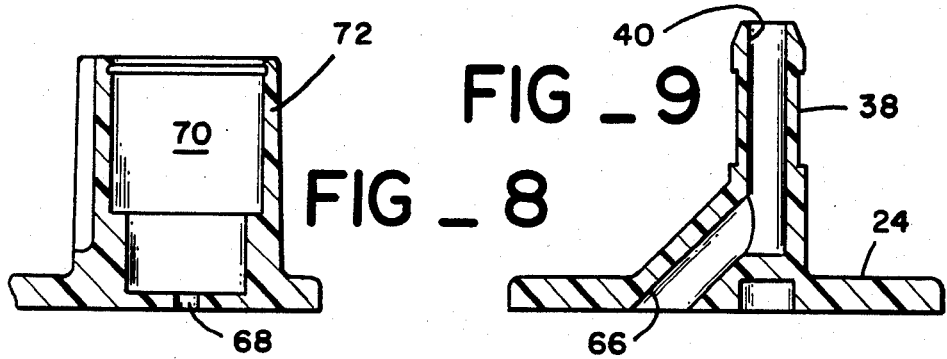
FIG_8  FIG_9

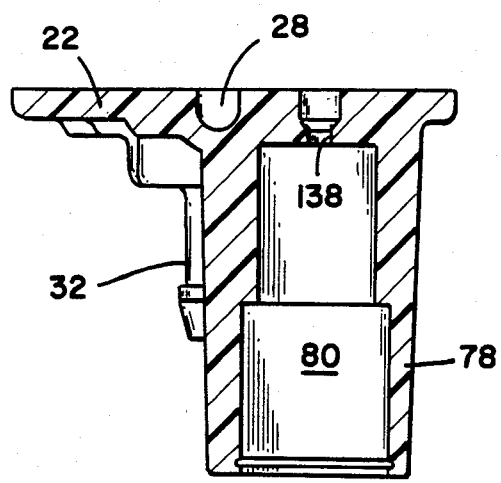
FIG_11
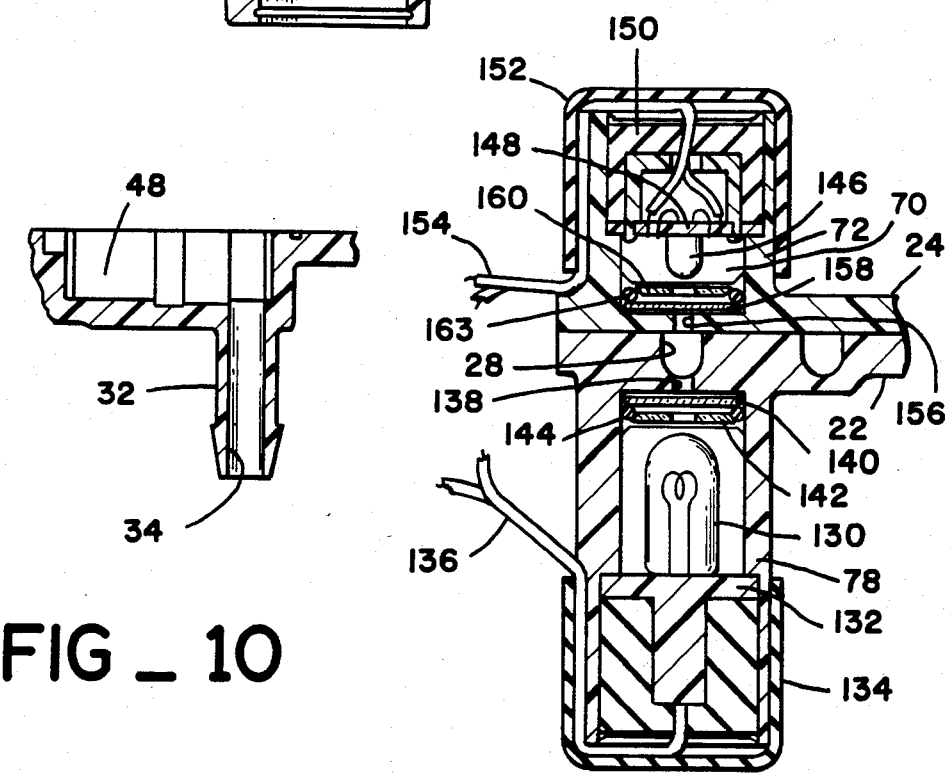
FIG_10
FIG_12

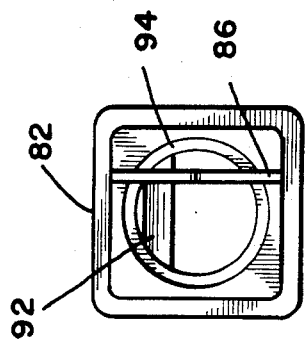
FIG_15
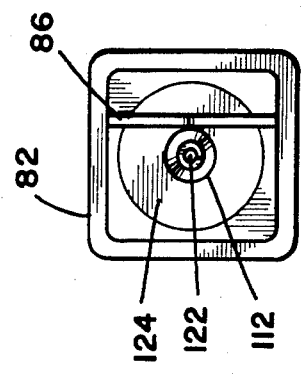
FIG_14
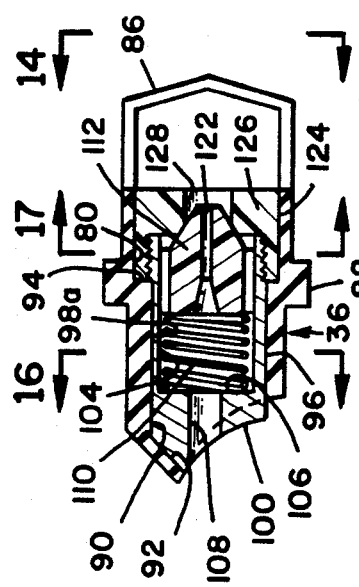
FIG_13
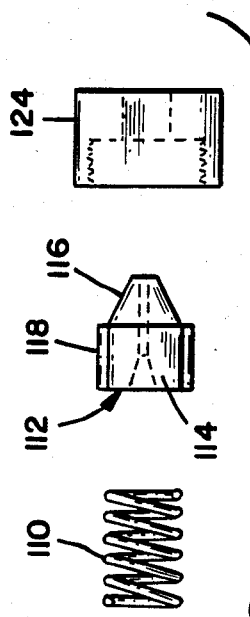
FIG_18
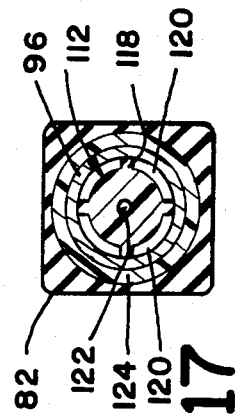
FIG_17
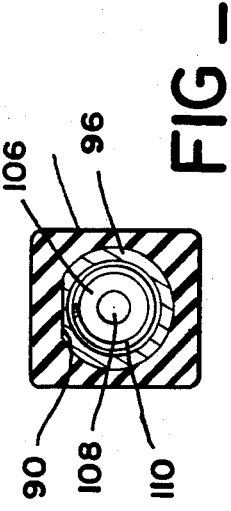
FIG_16

FLOW SENSOR

BACKGROUND OF THE INVENTION

This invention relates to a fluid flow meter or sensor particularly adapted for measuring the flow rate of fuel to an internal combustion engine.

In fluid flow sensors previously developed, a continuous circular cavity or raceway was provided having an inlet to the fluid supply source and an outlet leading to the fluid using apparatus (e.g., an engine). A small ball supported by the fluid in the circular cavity moved with the fluid current in a continuous circular path, and on every lap of the circular path, the ball passed through a sensor element. Thus, every complete circuit of the ball around the circular path provided a measurable signal for computing the volume of fluid flow per unit of time. Such a flow sensor device is described in greater detail in U.S. Pat. No. 4,263,812, which is assigned to the same assignee as the present invention.

While the aforesaid arrangement cell was successful, it had inherent disadvantages and problems. For example, under certain conditions, such as a relatively low fuel flow rate (which often occurs with modern, economical engines), insufficient fluid force may be applied to the ball to keep it moving consistently with the fuel within its raceway. This low flow condition often resulted in false readings by the sensor element, thereby reducing the accuracy of the flow rate measurement. It was found that by reducing the size of the fluid inlet to the raceway, an increased force on the circulating ball could be obtained, but at higher flow rates, excessive back pressure was created which also decreased the accuracy of the flow meter. Thus, the problem arose of providing an improved flow meter capable of increased performance and greater reliability, and particularly one that would produce accurate measurements for fluid flow within the entire range of relatively low flow rate to relatively high flow rate.

It is, therefore, a general object of the present invention to provide an improved fluid flow meter that solves the aforesaid problems.

Another object of the invention is to provide a flow meter or sensor that is more sensitive and more accurate, particularly at relatively low rates.

Another object is to provide a flow meter that is rugged, reliable, and particularly well adapted for ease and economy of manufacture.

Another more specific object of the present invention is to provide an improved fluid meter for measuring fluid flow rates of the type wherein a circulating ball moves with the fluid in a continuous raceway and that utilizes means at the inlet to the raceway for providing a relatively small opening at low flow rates and a relatively large opening at high flow rates, so that despite the rate of fluid flow, there is always sufficient force on the ball to keep it circulating within the fluid in the raceway and yet no excess back pressure is produced at high flow rates.

Another object of the invention is to provide a fluid meter for an internal combustion engine having an oval raceway with a circulating ball and a nozzle means in the inlet to the raceway which will provide a fluid meter for an internal combustion engine having an oval raceway with a circulating ball and a nozzle means in the inlet to the raceway which will provide a relatively small opening for the fluid at low flow rates and will automatically provide a larger opening at relatively high flow rates, so that adequate fluid force on the ball is produced to keep it moving smoothly and excessive back pressure is avoided throughout the entire range of fuel flow rates for the engine.

SUMMARY OF THE INVENTION

A fluid flow meter according to the invention that accomplishes the above objectives, comprises a pair of molded body members which are held firmly together by a series of suitable fasteners at spaced apart intervals along the periphery of engaging flange portions. Internally, the body members form an oval shaped continuous cavity, or raceway, one body providing an inlet to and the other body member providing an outlet from the cavity. A ball is provided for travel within the continuous cavity and is sizes so that it will move freely with fluid in the cavity as it circulates around. The ball is specially constructed so that its overall specific gravity is the same or substantially the same as the fluid flowing in the cavity. The sensing means, such as a photoelectric cell, is provided adjacent one side of the raceway so that, as the ball in the fluid being metered passes by it during each lap around the raceway, the sensing means produces a pulse signal. These signals can then be supplied to an electronic processing device to provide an output commensurate with the fluid flow rate.

Within a shaped recess formed by the upper and lower body members is a nozzle assembly that directs incoming fluid through the inlet into the raceway. The nozzle assembly includes an outer member with a relatively large outlet end opening to accommodate high fluid flow rates and an inner plunger member that is movable therein and has a central passage considerably smaller than the end opening. At relatively flow flow rates, the plunger is sealed against the inlet end of the outer member so that fluid can flow only through its small central passage. As the flow rate increases, the plunger is moved axially so that the fluid can bypass the plunger and flow more freely out the relatively large outlet opening of the nozzle assembly. Thus, the flow meter has a wide operating range from low flow rates to high flow rates while always providing a positive force on the ball within the raceway and without producing back pressure, thereby increasing the accuracy of the flow rate measurement.

Other objects, advantages and features of the invention will become apparent from the following detailed description of one embodiment thereof, presented in conjunction with the accompanying drawing.

BRIEF DESCRIPTION OF THE DRAWING

FIG. 1 is a view in perspective of a flow meter embodying principles of the present invention;

FIG. 2 is a view in side elevation of the flow meter of FIG. 1;

FIG. 3 is a bottom view of the flow meter of FIG. 2;

FIG. 4 is a top view of the lower body member taken at line 4—4 of FIG. 2;

FIG. 5 is a view in section taken at line 5—5 of FIG. 4.

FIG. 6 is a top view of the flow meter of FIG. 1;

FIG. 7 is a bottom view of the upper body member taken at line 7—7 in FIG. 2;

FIG. 8 is a view in section taken at line 8—8 of FIG. 6;

FIG. 9 is a view in section taken at line 9—9 of FIG. 6;

FIG. 10 is a fragmentary view in section taken at line 10—10 of FIG. 4;

FIG. 11 is a view in section taken at line 11—11 of FIG. 3;

FIG. 12 is a view in section taken at line 12—12 of FIG. 2;

FIG. 13 is a view in section of a nozzle assembly for the flow meter of FIGS. 1–12;

FIG. 14 is a rear view of the the nozzle assembly of FIG. 13 with the nozzle element installed;

FIG. 15 is a rear view of the nozzle assembly similar to FIG. 14, but with the nozzle element removed;

FIG. 16 is a view in section of the nozzle member of FIG. 2 taken at line 16—16 thereof;

FIG. 17 is a view in section of the nozzle member of FIG. 13, taken at line 17—17 thereof; and FIG. 18 is an exploded view of the nozzle assembly shown in FIG. 13.

DETAILED DESCRIPTION OF EMBODIMENT

Referring to the drawing, FIG. 1 shows a fluid flow rate meter or sensor 20 embodying principles of the present invention as it appears assembled and ready for installation; for example, in combination with an internal combustion engine, to provide a continuing source of fuel flow rate data. Such data, together with other inputs such as time and engine speed to a microcomputer aboard an automobile, can be used to provide various actual and predicted engine performance information to the driver.

In general, the flow rate meter 20 comprises an inlet body section 22 and an outlet body section 24 which are held together at their periphery by a series of spaced apart screw fasteners 26. Both body sections are preferably formed from a suitable molded plastic or metal material and internally, they form a continuous oval shaped raceway 28 for a movable ball 30. (See FIG. 8). The lower or inlet body section 22 has an integral inlet hose bib 32 extending therefrom that is connectable to a source of fluid (e.g., gasoline) and provides a passage 34 that leads to an internal nozzle assembly 36. (See FIG. 13). Fluid from the nozzle assembly flows into the internal raceway to cause the ball to circulate.

In accordance with the invention, this nozzle assembly enables fluid to flow through either one of two of its outlet ports, depending on the amount of fuel flow. These ports are of different sizes so that even at low fuel consumption rates, the fluid will always provide a fluid jet with an even flow into the raceway and having an adequate force to keep the ball moving consistently with and at the same rate as the fluid therein, thereby enabling accurate measurement of the fluid flow rate. This nozzle assembly will be described later in greater detail in conjunction with FIGS. 13–18.

The upper or outlet body section 24 has an integral outlet hose bib 38 that provides a passage 40 extending from the internal raceway 28 and is connectable to a fluid using device (not shown) such as an engine carburetor. The ball 30 is specially constructed (e.g. a molded plastic material) to have an overall density substantially the same as that of the fluid flowing in the raceway, an sized so that it will move at the same rate as the fluid without any significant friction on the walls of the raceway. At a preselected location adjacent the raceway is a suitable sensor element 42 that provides an electrical signal each time the ball in the raceway passes by or through it. One form of this sensor element will be described in greater detail below relative to FIG. 12.

Now, describing the structural components in greater detail, the lower inlet body 22, as seen in FIGS. 3–5, has a generally oblong shape with a flat top surface 44 adapted to fit against a similarly flat surface on the upper body 24. The surface 44 is interrupted by a plurality of recesses including a first, oval shaped recess that forms the raceway 28. Extending from one side of the raceway is an outlet passage 46 for fluid leaving the raceway. Directly adjacent the raceway is another irregular shaped recess 48 adapted to receive the internal nozzle assembly 36. This recess 48 extends from one curved end of the raceway and is generally rectangular with an enlarged intermediate groove 50 extending from its opposite sides. At its outer end is a narrowed recess portion 52 which communicates with the inlet passage 34 of the inlet bib 32. Surrounding this narrowed recess portion is a relatively narrow groove 54 which forms the outer end of the recess 48. Completely surrounding the raceway 28 and just inside a series of holes 56 for the fasteners 26 is a generally rectangular groove 58 which is adapted to retain an elastomeric sealing ring that becomes seated between the upper and lower elements when they are assembled.

Turning to FIGS. 6–9, the upper body element 24 has a lower flat surface 60 adapted to engage surface 44 of the lower element. A recess 62 is provided which is similar in shape to and adapted to align with the recess 48 so as to receive the nozzle assembly 36. Thus, it has a curved surface 64 at one end which is adjacent the raceway in the lower body element, a side projecting groove portion 50a and a relatively narrow recess portion 52a at its outer end. Spaced from the recess 62 is a passage 66 which communicates with the recess 46 in the lower body element when the flow meter 20 is assembled. This latter passage, as shown in FIG. 6, connects with the outlet passage 40 of the bib 38.

Spaced from the curved end of the recess 62 is another opening 68 which, as shown in FIG. 8, communicates with a cavity 70 within a boss 72 that houses a portion of the sensor device. Spaced near the outer edge of the upper body element are holes 56a which are aligned with the holes 56 when the upper and lower elements are assembled.

As shown in FIGS. 1 and 2, the recesses 48 and 62 Provide exterior protrusions 74 and 76 that extend below and above the peripheral flange portions of the elements and retain the nozzle assembly 36. The sensor unit is housed within the boss 70 on the upper element and a similar boss 78 on the lower body element that forms a cavity 80, as shown in FIG. 11.

The nozzle assembly 36, which is retained between the upper and lower body sections within the recesses 48 and 62 is shown in detail in FIGS. 13–18. It includes an outer housing 80, preferably formed of a durable molded plastic material and having generally the same shape as the recesses 48 and 62 so as to fit snugly therein. Thus, the exterior of the nozzle housing has a generally rectangular shaped cross-section as well as an intermediate flange portion 82. At its front end, the housing has a curved face 84 to conform with the curvature of the raceway and the curvature of surface 64 in the recess 62. At its rear end is an integral, generally U-shaped extension which forms a sealing member 86 that fits within the groove 54 in the lower inlet section 22. Extending inwardly from its rear end, the housing 80 has a first cylindrical bore 88 that is concentric with a somewhat smaller bore 90 which extends through a relatively large opening 92 at the front end of the housing. The junction of these two bores near the middle of the housing forms a circular shoulder 94.

Retained within the housing is a nozzle member 96 that fits within its smaller diameter bore 90. The nozzle member is generally cylindrical except that on one side it has a flat surface 98 which is adapted to be directly adjacent a similar flat surface 98a on the side of the bore 90, thereby positioning the nozzle member precisely within the housing 80.

At the front end of this nozzle member is a concave surface 100 with essentially the same curvature as the curved front end of the nozzle housing. On the rear end of the nozzle member is an externally threaded portion 102. Extending inwardly from this threaded end of the nozzle is a smooth cylindrical bore 104 that terminates at an internal end wall 106 near its concave end. Concentric with the bore and extending through the end wall is a cylindrical opening or exit port 108.

Within the nozzle member, when assembled, is a coil spring 110 that is seated at one end against the internal end wall 106 around the exit port. The other end of the spring bears against one end of a movable plunger 112. This plunger has a cylindrical portion 114 extending from one end which connects to an integral frusto-conical portion 116 at its other end. Extending radially outward at 90 degree intervals on the surface of the cylindrical portion is a series of four longitudinal fin members 118. The diametral distance between the outer edges of both pairs of fins on the plunger is such that the plunger forms an easy sliding fit within the nozzle bore 104. Thus, between the fin members are formed longitudinal fluid passages 120. Through the center axis of the plunger is a relatively small bore 122 or passage that diverges at the cylindrical end of the plunger.

A cover member 124 is provided to hold the plunger 112 within the nozzle member 96 against the spring 110. This cover member is generally cylindrical with an annular end wall 126 from which extends a skirt portion having internal threads that engage the threaded end portion of the nozzle. A central opening 128 is provided in the end wall which has a diameter that is substantially greater (e.g. 3–5 times) than the diameter of the plunger passage 122. At the inner end of the central opening 128, its peripheral edge is champhered at the same angle as the conical portion of the plunger. Thus, when assembled, the spring 110 holds the plunger firmly against the inner end of the central opening 128 in a sealing engagement.

When the nozzle element is fully assembled, it is placed within the housing bore in the only position possible, with the flat sides 98, 98a of both components engaged. The cover 124 of the nozzle element fits within the larger bore 80 of the housing. Now, with the nozzle element within the housing to form the nozzle assembly 36, the latter can be quickly and easily installed within the recesses 48, 62 of the two body members before they are connected together by the fasteners 26. When installed, the exit portion of the nozzle is directed tangentially along one side of the raceway, so that fuel flows smoothly into it.

When the engine to which the flow sensor is attached is operating at a relatively low speed and/or a low load so that fuel comsumption is relatively low, the force of the fuel flow will not be sufficient to overcome the spring force. Thus, at low flow rates, the plunger will remain seated on the end wall 126 and fluid through its opening will pass through the relatively small passage 122 of the plunger and then through the exit port 108. However, as fuel consumption and fuel flow increases, the small passage will be unable to handle it and fuel pressure against the plunger will increase. This will cause the plunger to move axially and thereby create an annular opening around the champhered inner edge of the central opening 128. At this point, fuel can now flow through this inlet opening, around the outside of the plunger and through the passages 120 between the fin members 118 and then out the exit port 108.

The automatic movement of the plunger in response to increased fuel flow as described allows the nozzle assembly, and thus the flow meter itself, to accommodate a wider range of fuel flow rates with equal precision and increased accuracy. At low flow rates, the fuel will still flow at a relatively steady rate in the small passage, thereby creating a slow but steady flow in the raceway 28 and thus a uniform, commensurate movement of the circulating ball within the fuel. As fuel flow increases, the transition to higher flow rates is still smooth and even because the fuel flows freely around the plunger through a considerably greater cross-sectional area. Again, the fuel movement within the raceway is smooth and the circulating ball will move freely within it to provide an accurate measurement.

The sensor element 42 which senses each revolution of the ball within the raceway is shown in one form in FIG. 12. Here, a light emitting element 130 attached to a base member 132 is mounted within the lower boss member 78 of the lower body member 22. The boss member is surrounded by an insulator 134 (e.g., rubber) and held within the boss member by a cap member 134 that fits over it. Lead wires 136 for the lamp extend from the base member outside of the cap to a suitable current source. The boss member 78 is situated directly below one side of the raceway and an opening 138 is provided between it and the cavity 80 formed by the boss member 78. A lens member 140 of clear plastic covers the opening and is held against it by an annular retainer 142 which presses against a sealing ring 144 around the periphery of the lens member.

In the boss member 22 on the upper body member 24, a photocell 146 attached to a base member 148 is held in place by a suitable insulated retainer 150, which in turn is held in place by a cap member 152 that fits over the boss member. Lead wires 154 from the photo cell extend from under the cap member to a suitable circuit for recording each ball revolution within the raceway. Here again, an opening 156 is provided between the raceway and the cavity 70 formed by the boss member, and this latter opening is aligned directly above the opening 138 to the lower boss member 78. A lens 158 of clear plastic covers the opening 156 and is held in place by a suitable annular retainer 160 which presses against a sealing ring 162 located near the periphery of the lens.

Thus, in operation, light from the source 130 passes through the lower lens 140, the lower opening 138, the fluid in the raceway 28, the upper opening 156, and through the upper lens 158 to impinge on the photo cell 146. As the ball in the raceway passes the openings 138 and 156 it interrupts the passage of light and causes a signal to be produced by the photo cell. With the dimensions of the raceway known, the frequency of the ball revolutions becomes a direct function of fluid flow rate. Circuitry for processing data related to actual flow rate using the signals produced from the photo cells can readily be devised and is not shown. Other forms of sensor devices could also be used within the scope of the invention, such as one wherein a metal covered ball will produce electromagnetic impulses. With whatever sensor is utilized, a highly reliable and accurate flow rate measurement can be provided even at extremely low flow rates, primarily because of the two stage nozzle element 36, as described.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

It is claimed:

1. A fluid flow sensor comprising:
 body means having an inlet and an outlet for fluid to be measured;
 means forming a continuous raceway within said body means having an inlet passage for receiving a fluid stream to be measured and an outlet passage for discharging the fluid;
 a race ball received in the raceway and caused to circulate at a rate in proportion to the flow rate of said fluid stream;
 an electromagnetic sensing means adjacent to said raceway for providing an electrical signal with each passage of said race ball; and
 nozzle means situated within said inlet passage and having an exit end adjacent said raceway, said nozzle means including means providing a first relatively small passage for said fluid when it flows at a relatively low rate and a second relatively large passage for said fluid when it flows at a relatively high rate, whereby, even at relatively low fluid flow rates, a sufficient force is produced at said exit end to keep the race ball and fluid therein moving smoothly in said raceway; said nozzle means comprising a nozzle having an exterior shape similar to the interior shape of a similar recess in said body means, a nozzle member seated in said housing having a central bore with an open port at its exit end and cover means attached to its inlet end with a central inlet opening, a plunger in said central bore, and spring means normally urging said plunger against said central inlet opening of said cover means, a relatively small passage extending longitudinally through said plunger and extension means extending from its outer surface, forming a plurality of longitudinal passage having a substantially greater cross-sectional area than said relatively small passage, whereby at low fluid rates said spring holds said plunger against said cover means to that fluid flows through said small passage, and at relatively high flow rates, said plunger moves axially against said spring within said nozzle member so that a greater volume of fluid can flow around said plunger through said longitudinal passages and through the exit end of said nozzle member.

2. The fluid flow sensor as described in claim 1 wherein said body means comprises a pair of integral upper and lower body members held together by fasteners, said lower body member having an oval shaped recess forming said raceway and a fluid inlet to said raceway containing said nozzle means, said exit end of said nozzle means being directed substantially tangentially along one side of said oval shaped recess and said upper body member having an outlet communicating with said raceway downstream from said exit end.

3. The fluid flow sensor as described in claim 1 wherein said exterior means on said plunger forming said longitudinal passages comprises a series of spaced apart longitudinally extending fins that form a sliding fit with the central bore of said nozzle member.

4. The fluid sensor as described in claim 1 wherein said nozzle housing has a first bore extending to near its front end for receiving said nozzle member and a concentric second and larger bore for receiving said cover means, said first bore having a flat surface on one side adapted to lie adjacent a flat surface on one side of said nozzle member so that its precise position within said housing is maintained.

5. The fluid sensor as described in claim 4 wherein said nozzle housing further includes a generally U-shaped sealing member extending from the rear end of said housing and adapted to fit within a matching groove within said body means.

* * * * *